United States Patent
Sekine et al.

(10) Patent No.: US 10,720,243 B2
(45) Date of Patent: Jul. 21, 2020

(54) LASER AMPLIFICATION APPARATUS, LASER APPARATUS, AND LASER NUCLEAR FUSION REACTOR

(71) Applicant: HAMAMATSU PHOTONICS K.K., Hamamatsu-shi, Shizuoka (JP)

(72) Inventors: Takashi Sekine, Hamamatsu (JP); Yoshinori Kato, Hamamatsu (JP); Yasuki Takeuchi, Hamamatsu (JP); Toshiyuki Kawashima, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 51 days.

(21) Appl. No.: 15/527,373

(22) PCT Filed: Nov. 18, 2015

(86) PCT No.: PCT/JP2015/082463
§ 371 (c)(1),
(2) Date: May 17, 2017

(87) PCT Pub. No.: WO2016/080466
PCT Pub. Date: May 26, 2016

(65) Prior Publication Data
US 2017/0330636 A1 Nov. 16, 2017

(30) Foreign Application Priority Data
Nov. 18, 2014 (JP) .................................. 2014-233729

(51) Int. Cl.
*G21B 1/23* (2006.01)
*G21B 1/03* (2006.01)
(Continued)

(52) U.S. Cl.
CPC .................. *G21B 1/23* (2013.01); *G21B 1/03* (2013.01); *H01S 3/042* (2013.01); *H01S 3/0604* (2013.01);
(Continued)

(58) Field of Classification Search
CPC ........... G21B 1/03; G21B 1/23; H01S 3/0407; H01S 3/042; H01S 3/0604; H01S 3/07; H01S 3/0906; H01S 3/091; H01S 3/2316
See application file for complete search history.

(56) References Cited

U.S. PATENT DOCUMENTS 3,289,077 A * 11/1966 Miller ....................... G01P 3/48
324/166
3,631,362 A * 12/1971 Almasi ................... H01S 3/042
372/35
(Continued)

FOREIGN PATENT DOCUMENTS

EP 1833127 A1 9/2007
JP H08-56029 A 2/1996
(Continued)

OTHER PUBLICATIONS

International Preliminary Report on Patentability dated Jun. 1, 2017 for PCT/JP2015/082463.

*Primary Examiner* — Sharon M Davis
(74) *Attorney, Agent, or Firm* — Faegre Drinker Biddle & Reath LLP

(57) ABSTRACT

The laser amplification apparatus is provided with a plurality of plate-shaped laser medium components (M1 to M4) which are disposed to be aligned along a thickness direction, and prisms (P1 to P3) which optically couples the laser medium components. Each of the laser medium components is provided with a main surface to which a seed light is incident, and a side surface which surrounds the main surface. An excitation light is incident from at least one side
(Continued)

surface of a specific laser medium component among the plurality of laser medium components. The excitation light is incident through the prism to a side surface of the laser medium component adjacent to the prism.

24 Claims, 14 Drawing Sheets

(51) Int. Cl.
*H01S 3/091* (2006.01)
*H01S 3/042* (2006.01)
*H01S 3/094* (2006.01)
*H01S 3/06* (2006.01)
*H01S 3/07* (2006.01)
*H01S 3/16* (2006.01)
*H01S 3/23* (2006.01)
*H01S 3/0941* (2006.01)
*H01S 3/04* (2006.01)

(52) U.S. Cl.
CPC .............. *H01S 3/0623* (2013.01); *H01S 3/07* (2013.01); *H01S 3/091* (2013.01); *H01S 3/094061* (2013.01); *H01S 3/1618* (2013.01); *H01S 3/1643* (2013.01); *H01S 3/2316* (2013.01); *H01S 3/0407* (2013.01); *H01S 3/0606* (2013.01); *H01S 3/0941* (2013.01); *H01S 3/094084* (2013.01)

(56) References Cited

U.S. PATENT DOCUMENTS

| | | | | |
|---|---|---|---|---|
| 5,774,489 | A * | 6/1998 | Moulton | H01S 3/0941 372/34 |
| 5,867,519 | A * | 2/1999 | Filgas | H01S 3/07 372/100 |
| 6,061,378 | A * | 5/2000 | Marshall | H01S 3/0941 372/75 |
| 2003/0043453 | A1* | 3/2003 | Smith | H01S 3/30 359/334 |
| 2007/0189346 | A1* | 8/2007 | Kawashima | H01S 3/042 372/35 |
| 2008/0063132 | A1* | 3/2008 | Birnbach | G21B 1/03 376/107 |
| 2008/0089372 | A1* | 4/2008 | Izawa | H01S 3/042 372/36 |
| 2012/0212804 | A1* | 8/2012 | Sarkisyan | H01S 3/2325 359/342 |

FOREIGN PATENT DOCUMENTS

| | | |
|---|---|---|
| JP | 2002-9375 A | 1/2002 |
| JP | 2002-141588 A | 5/2002 |
| JP | 2003-198012 A | 7/2003 |
| JP | 2004-356479 A | 12/2004 |
| JP | 2005-32935 A | 2/2005 |
| JP | 2005-101223 A | 4/2005 |
| JP | 2007-299829 A | 11/2007 |
| JP | 2008-521257 A | 6/2008 |
| WO | WO-2006/057941 A2 | 6/2006 |

* cited by examiner

LASER AMPLIFICATION APPARATUS, LASER APPARATUS, AND LASER NUCLEAR FUSION REACTOR

TECHNICAL FIELD

The present invention relates to a laser amplification apparatus, a laser apparatus, and a laser nuclear fusion reactor.

BACKGROUND ART

A laser nuclear fusion reactor is expected as an apparatus which serves as a next-generation energy supplier. In the laser nuclear fusion reactor, it is necessary to achieve high power of a laser light used therein. Currently, a laser apparatus which can output a laser light of 100 J is under development as a national project, but such a laser apparatus having large output power has not yet been realized.

In a laser amplification apparatus disclosed in Patent Literature 1, a 3-level dopant (Yb) is added, an excitation light is emitted to a side surface of a YAG disk laser, and a seed light is input to a main surface. As the laser apparatus, the apparatuses disclosed in Patent Literatures 2 and 3 are also known.

CITATION LIST

Patent Literature

[Patent Literature 1] Japanese Unexamined Patent Publication No. 2004-356479
[Patent Literature 2] Japanese Unexamined Patent Publication No. 2005-32935
[Patent Literature 3] Japanese Unexamined Patent Publication No. 2002-141588

SUMMARY OF INVENTION

Technical Problem

However, a laser apparatus in the related art is not possible to obtain a high-power laser light which can be applied to the laser nuclear fusion reactor. For example, since the amount of excitation light absorbed in a laser medium is not sufficient in Patent Literature 1, it is not possible to achieve the high output power.

The invention has been made in view of such a problem, and an object thereof is to provide a laser amplification apparatus, a laser apparatus and a laser nuclear fusion reactor using the laser amplification apparatus.

Solution to Problem

In order to solve the problem described above, a first laser amplification apparatus according to an aspect of the present invention includes: a plurality of plate-like laser medium components disposed to be aligned along a thickness direction; and a prism configured to optically couple the laser medium components, wherein each of the laser medium components is provided with a main surface to which a seed light is incident, and a side surface configured to surround the main surface, wherein an excitation light is incident from at least one side surface of a certain medium component among the plurality of laser medium components, and the excitation light is incident through the prism to a side surface of the laser medium component adjacent to the prism.

If the excitation light can be sufficiently absorbed in the laser medium, the energy accumulated in the laser medium can be increased, and the output of the increased laser light can be increased. It is considered that there is a need to increase the concentration of dopant in the laser medium in order to absorb the excitation light in the laser medium. However, the laser medium has three stable absorption bands, and in the case of a 3-level laser medium for light emission, the seed light is absorbed again when the laser medium transitions among these energy levels. In practice, the output of the excitation light is not increased so much.

For this reason, in the first laser amplification apparatus, the plurality of laser medium components are used and connected by the prisms, so that a distance (absorbing length) of the excitation light propagating in the laser medium components is increased, and the amount of absorption of the excitation light is increased even when an additive has a low concentration. Then, when the excitation light is incident from the side surface, the seed light is largely amplified and output.

A second laser amplification apparatus further includes an excitation light source configured to emit the excitation light. As an excitation light source, a device for focusing solar light may be used besides a semiconductor laser, a gas laser, and a flash lamp. Since the semiconductor laser itself has no high output, a laser diode array module is desirably used.

A third laser amplification apparatus further includes a coolant supply source configured to supply a coolant to a gap between the laser medium components. Since the laser medium component generates heat, when these components are aligned and a coolant is supplied, the laser medium component is kept in a desired temperature (for example, a low temperature), and the laser amplification can be made stably. For example, water, nitrogen gas, helium gas, other rare gas, fluorine-based inactive gas, or heavy water may be used as the coolant.

In a fourth laser amplification apparatus, a side surface of the certain laser medium component to which the excitation light is first incident is subjected to an antireflection treatment with respect to the excitation light. In an antireflection treatment, an antireflective film is formed by deposition, and also the side surface is subjected to a refractive index matching in which a material having an intermediate refractive index between the laser medium component and the air is tightly attached. Therefore, the reflection of the excitation light is suppressed to introduce the excitation light into the laser medium component.

In a fifth laser amplification apparatus, a reflective film is provided in a side surface of the laser medium component from which the excitation light is emitted lastly. In this case, the excitation light is reflected by a reflective film. Therefore, the excitation light can reciprocate in the laser medium component, and an absorbing length can be lengthened still more.

In a sixth laser amplification apparatus, the main surface of the laser medium component is subjected to an antireflection treatment with respect to a seed light, the side surface of the laser medium component and the prism are glued or bonded to each other, and the laser amplification apparatus further includes: an enclosure configured to store the laser medium component and the prism; and an absorber configured to be provided in an inner surface of the enclosure and absorb a spontaneous emission light from the laser medium component.

In addition, the laser amplification apparatus according to embodiments of the invention can employ a structure which can suppress an unnecessary resonance. As described above, since the main surface of the laser medium component is subjected to the antireflection treatment, the reflection of the seed light caused by the laser medium component can be suppressed, and an unnecessary resonance is suppressed. In addition, since the side surface of the laser medium component and the prism are glued or bonded, the excitation light is surely introduced from the side surface of the laser medium component into the prism. In the laser medium component, the energy accumulated by the excitation light is discharged little by little as the light having the same wavelength as that of the seed light. This light is called a spontaneous emission light. Since the side surface of the laser medium component and the prism are glued or bonded, the reflection of the spontaneous emission light is suppressed, and an unnecessary oscillation can be suppressed.

Further, in a boundary between the laser medium component and the prism, it is desirable to suppress the reflection from the viewpoint of propagating the excitation light with a low energy loss. Since the spontaneous emission light leaking from the laser medium component or the prism to the outside serves as a cause of resonance, an absorber is provided in the inner surface of an enclosure, and the light is absorbed by the absorber, so that unnecessary resonance can be suppressed.

In a seventh laser amplification apparatus, the laser medium component is made only by a laser medium, or is provided with a laser medium and a holder configured to support the laser medium to surround a side surface of the laser medium.

In an eighth laser amplification apparatus, the laser medium is a disk shape. The seed light is emitted to the main surface of the laser medium. However, in a case where the laser light is focused and applied, it is desirable that a beam shape be a circular shape. In a case where there is an angular portion such as a rectangular, the energy becomes a light condensing pattern in which the energy is dispersed in space where a spatial high frequency component is reflected. When the laser medium is formed in a disk shape, the shape of the beam propagating in the disk-shaped laser medium is set to a circular shape, and a good light condensing pattern can be obtained.

In a ninth laser amplification apparatus, a material of the laser medium is a Yb-additive YAG. The concentration of Yb is equal to or less than 0.3 wt % as a desirable example. In a case where a Yb:YAG material is used as a laser medium, the laser light is generated by a 3-level transition. However, the output of the laser light can be significantly improved by setting the concentration of Yb within the above range.

In addition, the laser apparatus is provided with a laser amplification apparatus and a seed light source which outputs the seed light. The seed light output from the seed light source is incident to the laser medium component and amplified.

A laser nuclear fusion reactor includes: the laser apparatus; and a chamber configured to store fuel for nuclear fusion when being irradiated with a laser light, and to which the laser light from the laser apparatus is introduced. In the laser nuclear fusion reactor, a high-output laser light is emitted to fuel to cause fusion. Therefore, nuclear fusion occurs in a chamber with efficiency, and the generated energy can be used in power generation.

Theoretically, when the laser light having an output of 50 J is input to the laser amplification apparatus, it is expected that the laser light (250 J) exceeds two times that of the national project (100 J).

Advantageous Effects of Invention

According to a laser amplification apparatus and a laser apparatus of the invention, it is possible to output a high-output laser light. Therefore, the high-output laser light can be emitted to the fuel for the nuclear fusion in the laser nuclear fusion reactor, so that it is possible to perform laser nuclear fusion.

DESCRIPTION OF EMBODIMENTS

Hereinafter, a laser amplification apparatus, a laser apparatus, and a laser nuclear fusion reactor according to an embodiment will be described. The same components will be attached with the same symbols, and the redundant descriptions will be omitted.

Figure 1:
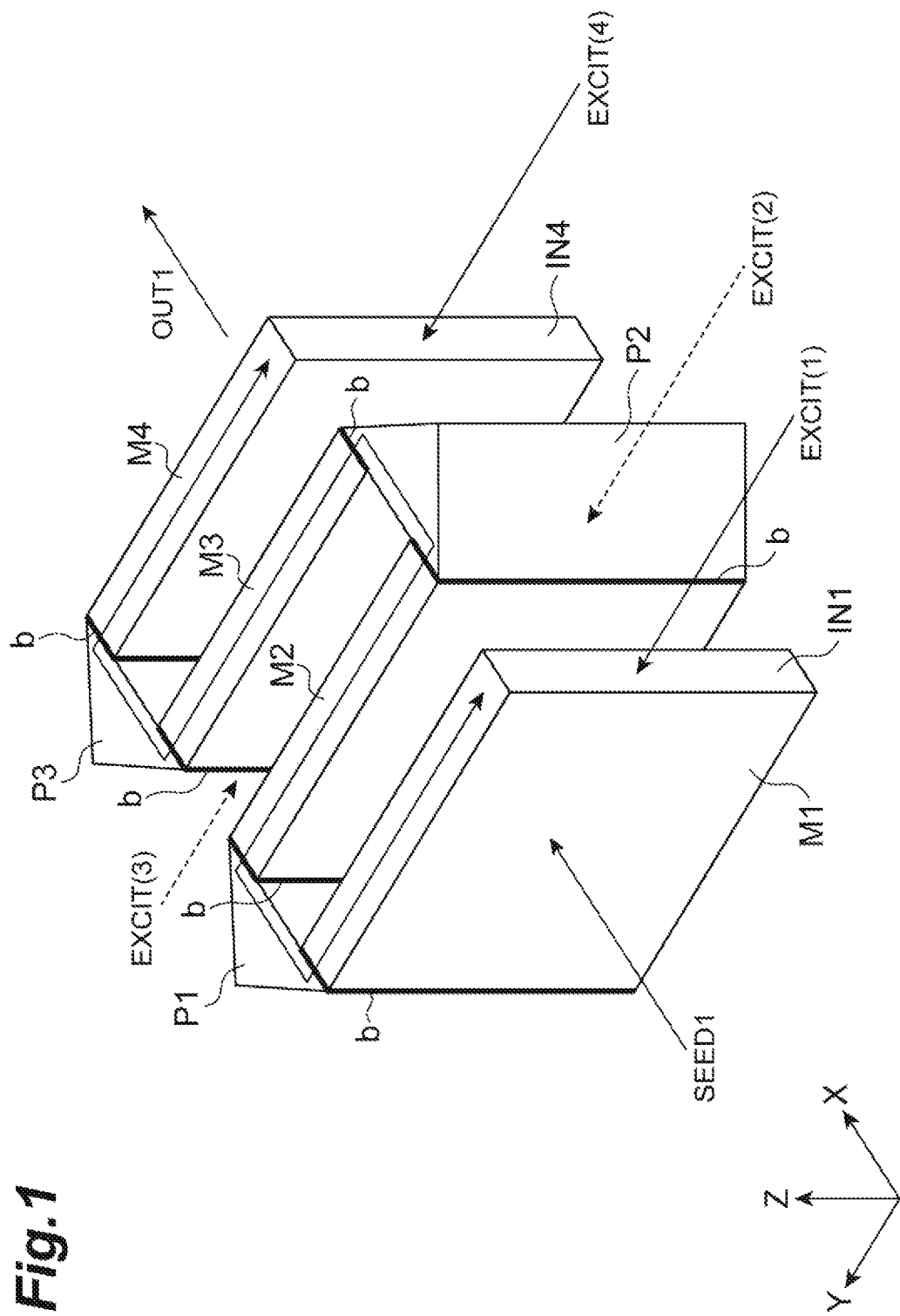
FIG. 1 is a perspective view of a laser medium component and a prism in a laser amplification apparatus.

FIG. 1 is a perspective view of a laser medium component and a prism in a laser amplification apparatus. A thickness direction of a first laser medium component M1 is set to an X-axis direction, and two axes perpendicular to the X axis are set to Y and Z axes. In the same drawing, the Z-axis direction is set to be vertically upward.

The laser amplification apparatus is provided with a plurality of plate-like laser medium components (M1, M2, M3, and M4). These laser medium components have the same shape, and are disposed to be aligned along the thickness direction (X axis). Further, the same effect may be obtained even when the laser medium components do not have the same shape.

The first laser medium component M1 and the second laser medium component M2 are optically coupled through a first prism P1 which is provided in the side surfaces thereof, the second laser medium component M2 and the third laser medium component M3 are optically coupled through a second prism P2 which is provided in the side surfaces thereof, and the third laser medium component M3 and the fourth laser medium component M4 are optically coupled through a third prism P3 which is provided in the side surfaces thereof.

Each of the laser medium components (M1, M2, M3, and M4) is provided with a main surface (YZ surface) to which a seed light SEED1 is incident perpendicular along the X-axis direction and side surfaces (two facing XZ surfaces and two facing XY surfaces) which surround the main surface. FIG. 1 illustrates an example in which the laser medium component is made of only the laser medium, and the laser medium is a cuboid of a flat plate shape.

An excitation light can be input to any one of the plurality of laser medium components, and the laser medium component is excited when the excitation light is incident. The excitation light is incident from at least one side surface of a certain laser medium component which is appropriately selected among the plurality of laser medium components. Preferably, an excitation light EXCIT(1) is incident from a side surface IN1 of the first laser medium component M1 which is positioned at the first stage.

In this way, an antireflection treatment is performed for the excitation light (and/or the spontaneous emission light) on a side surface of the certain laser medium component to which the excitation light is firstly incident. Further, in the "antireflection treatment" of the description, the side surface is also subjected to the refractive index matching to attach a material having a refractive index between the prism and the air to the laser medium component (for example, a liquid refractive index matching material) besides forming an antireflective film. Therefore, the reflection of the excitation light is suppressed to introduce the excitation light into the laser medium component.

When the excitation light EXCIT(1) is input, the excitation light EXCIT(1) progresses in the first laser medium component M1 along the positive direction of the Y-axis direction, and the first laser medium component M1 is excited. At the end in the Y-axis direction, the first prism P1 is fixed through the side surface (XZ surface) of the end portion. The shape of the first prism P1 is a triangular prism extending along the Z-axis direction as the center axis, and the shape in the XY plane is a right-angled isosceles triangle. Further, the first prism P1, the second prism P2, and the third prism P3 have the same structure.

The plane (XZ surface) containing a hypotenuse part of the right-angled isosceles triangle of the first prism P1 (hereinafter, referred to as an excitation-light input/output surface in the prism) and the side surface (XZ surface) of the end portion in the Y-axis direction of the first laser medium component M1 are disposed to face each other, and subjected to the antireflection treatment to suppress the excitation light (and/or the spontaneous emission light) from being reflected at the boundary therebetween. In addition, gluing or bonding may be also possible. In the case of adhesion, an adhesive b is interposed between these surfaces.

In a case where the adhesive b is used, an adhesive such as a resin refractive index matching adhesive and a glass index matching adhesive may be used. In a case where the adhesive is not used, bonding such as thermal diffusion bonding, optical contact, and ion sputtering bonding may be used. In a case where the outer surface of the laser medium component and the prism are made of ceramics, these components can be fixed using a ceramic sintering bonding.

The excitation light EXCIT(1) which is incident from the first laser medium component M1 to the first prism P1 is reflected on a surface containing one of two sides other than the hypotenuse part of the right-angled isosceles triangle (a surface in parallel with Y=X. Hereinafter, referred to as a first reflection surface), and reflected again on the surface containing the other one of the two sides (a surface in parallel with Y=−X. Hereinafter, referred to as a second reflection surface in the prism), and incident from the side surface at the end in the positive direction of the Y axis into the second laser medium component M2. The excitation light EXCIT(1) progresses in the second laser medium component M2 along the negative direction of the Y axis to excite the second laser medium component M2.

The second laser medium component M2 has the same structure as that of the first laser medium component M1, and faces the excitation-light input/output surface of the first prism P1 in the side surface (XZ plane) on a side near the end in the positive direction of the Y axis of the second laser medium component M2. The second laser medium component M2 and the excitation-light input/output surface of the first prism P1 are subjected to the antireflection treatment to suppress the reflection in the boundary thereof. In addition, gluing or bonding may be also possible. In the case of adhesion, an adhesive b is interposed between these surfaces.

In this way, the excitation light EXCIT(1) incident to the first laser medium component M1 passes through the first prism P1 and is incident to the side surface of the second laser medium component M2 which is adjacent to the first prism, and excites these laser medium components.

Hereinafter, similarly, the excitation light EXCIT(1) sequentially excites the third laser medium component M3 and the fourth laser medium component M4, and reaches a side surface IN4 which is the end surface in the negative direction of the Y axis of the fourth laser medium component M4.

In detail, the excitation light EXCIT(1) incident from the second laser medium component M2 to the second prism P2 is reflected on the second reflection surface in the prism, and reflected again on the first reflection surface, and thus is incident from the side surface positioned at the end in the negative direction of the Y axis into the third laser medium component M3. The excitation light EXCIT(1) progresses in the third laser medium component M3 along a positive direction of the Y axis.

The third laser medium component M3 has the same structure as that of the first laser medium component M1, and faces the excitation-light input/output surface of the second prism P2 in the side surface (XZ plane) on a side near the end in the negative direction of the Y axis of the third laser medium component M3. The third laser medium component M3 and the excitation-light input/output surface of the second prism P2 are subjected to the antireflection treatment to suppress the reflection in the boundary thereof. In addition, gluing or bonding may be also possible. In the case of adhesion, an adhesive b is interposed between these surfaces.

The excitation light EXCIT(1) incident from the third laser medium component M3 to the third prism P3 is reflected on the first reflection surface in the prism, reflected again on the second reflection surface, and incident from the side surface positioned at the end in the positive direction of the Y axis into the fourth laser medium component M4. The excitation light EXCIT(1) progresses along the negative direction of the Y axis in the fourth laser medium component M4, and excites the fourth laser medium component M4.

The fourth laser medium component M4 has the same structure as that of the first laser medium component M1, and faces the excitation-light input/output surface of the third prism P3 in the side surface (XZ plane) on a side near the end in the positive direction of the Y axis of the fourth laser medium component M4. The fourth laser medium component M4 and the excitation-light input/output surface of the third prism P3 are subjected to the antireflection treatment to suppress the reflection in the boundary thereof. In addition, gluing or bonding may be also possible. In the case of adhesion, an adhesive b is interposed between these surfaces.

If there is no specific process, the side surface IN4 of the fourth laser medium component M4 serves as a light emission surface of the excitation light EXCIT(1). In order to suppress the resonance in the laser medium by suppressing the reflection of the excitation light EXCIT(1) in the side surface IN4, the antireflection treatment is performed on the side surface IN4.

On the other hand, in a case where the antireflection treatment is performed in the side surface IN1 at the beginning, the excitation light can reciprocate in the laser medium component group as long as the excitation light EXCIT(1) is reflected in the final side surface IN4. Therefore, the reflective film may be provided in the final side surface IN4. In other words, the reflective film is provided in the side surface IN4 through which the excitation light is finally emitted among the laser medium components. In this case, since the excitation light is reflected on the reflective film, the excitation light can reciprocate in the laser medium component, and can make an absorbing length longer.

Further, when part of the seed light which is amplified by the laser medium and the spontaneous emission light generated by the laser medium turn back into the laser medium, the seed light completes its role. Therefore, an unexpected amplification/oscillation and a resonance may occur. Accordingly, the energy accumulated in the laser medium may be discharged. Such a discharging causes a great loss, and the efficiency of the entire laser amplifier is remarkably reduced. Therefore, a process of resonance control is performed on each member.

As described above, in a case where the single excitation light EXCIT(1) is incident into the laser medium component, all the laser medium components are excited by the excitation light. However, another excitation light may be incident into the laser medium component group.

For example, in addition to the incidence to the side surface IN1 of the excitation light EXCIT(1), an excitation light EXCIT(4) may be incident into the fourth laser medium component M4 from the last side surface IN4. In this case, the excitation light EXCIT(4) progresses along a path in the reverse direction to the excitation light EXCIT(1), and is emitted from the side surface IN1 of the first laser medium component M1. Further, it is desirable that the first side surface IN1 and the final side surface IN4 be subjected to the antireflection treatment. In the laser medium component group, two excitation lights EXCIT(1) and EXCIT(4) progressing in the reverse direction to each other are incident, so that much more energy can be accumulated in the laser medium component group.

Further, in the example described above, the number of laser medium components is "4". However, the same function may be achieved even when the number of laser medium components is "3", "5", or more as long as the number of the laser medium components is equal to or more than "2".

In a case where the number of laser medium components is only "2" at the beginning, an excitation light EXCIT(2) may be incident into the second laser medium component M2 from the side surface at the end in the negative direction of the Y axis of the second laser medium component M2. In this case, the second prism P2 is not provided.

In a case where the number of laser medium components is only "3" at the beginning, an excitation light EXCIT(3) may be incident into the third laser medium component M3 from the side surface at the end in the positive direction of the Y axis of the third laser medium component M3 In this case, the third prism P3 is not provided.

A doping concentration of the laser medium component may be different. For example, in a case where EXCIT(1) is incident from the first laser medium component M1, the amount of energy accumulated in the first laser medium component M1 and the second laser medium component M2 may be equal by decreasing the doping concentration of the laser medium component M1 and by increasing the doping concentration of the second laser medium component M2.

Similarly, since the doping concentration of the third laser medium component M3 is higher than that of the second laser medium component M2, and the doping concentration of the fourth laser medium component M4 is higher than that of the third laser medium component M3, the accumulated energy of the laser medium component group can be evenly distributed.

Therefore, it is possible to suppress an unexpected amplification/oscillation and a resonance which easily occur in a place where the accumulated energy is high. As a result, much more energy can be accumulated in the laser medium component group.

In addition, in a case where the first laser medium component M1 and the fourth laser medium component M4 are excited by the excitation lights EXCIT(1) and EXCIT (4), respectively, the doping concentrations of the first laser medium component M1 and the fourth laser medium component M4 become low, and the doping concentrations of the second laser medium component M2 and the third laser medium component M3 become high. When the number of laser medium components is increased, the number of types of the doping concentration is also increased in accordance therewith.

If the excitation light can be sufficiently absorbed in the laser medium, the energy accumulated in the laser medium can be increased, and the output of the increased laser light can be increased. It is considered that there is a need to increase the concentration of dopant in the laser medium in order to absorb the excitation light in the laser medium. However, the laser medium has three stable absorption bands, and in the case of a 3-level laser medium for light emission, the seed light SEED1 is absorbed again when the laser medium transitions among these energy levels. In practice, the output of the excitation light is not increased so much.

For this reason, in the laser amplification apparatus, the plurality of laser medium components (M1 to M4) are used and connected by the prisms (P1 to P3), so that a distance (absorbing length) of the excitation light propagating in the laser medium component is increased, and the amount of absorption of the excitation light is increased even when an additive has a low concentration. Therefore, when the excitation light is incident from the side surface and the seed light SEED1 is incident from the main surface of the first laser medium component M1, the seed light is amplified greatly and output from the fourth laser medium component M4 as an amplified laser beam OUT1.

Figure 2:
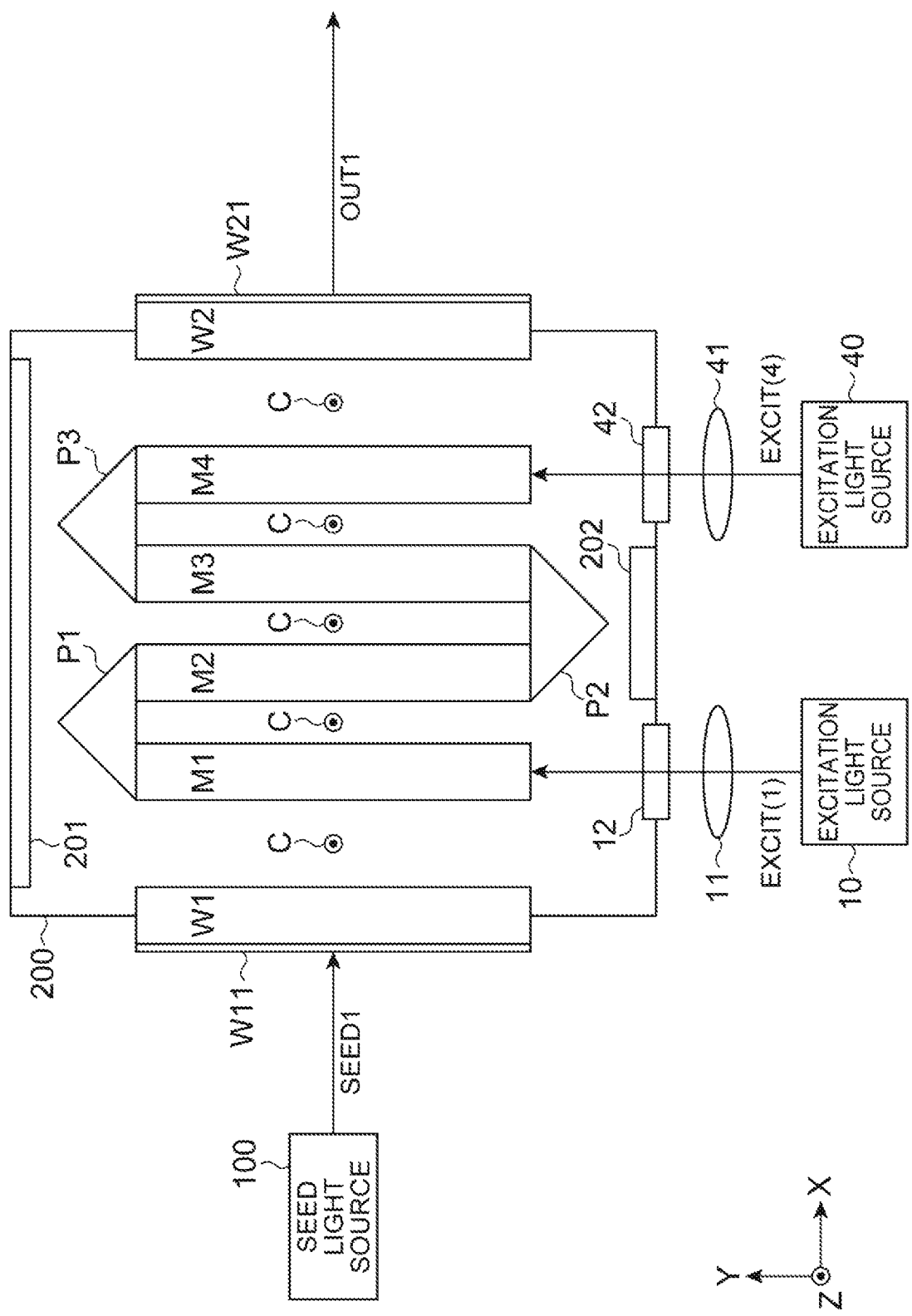
FIG. 2 is a diagram illustrating a system configuration of a laser apparatus of the laser amplification apparatus.

FIG. 2 is a diagram illustrating a system configuration of the laser apparatus of the laser amplification apparatus.

The laser amplification apparatus is provided with an excitation light source to output the above excitation light. Further, as an excitation light source, a device for focusing the solar light may be used besides a semiconductor laser, a gas laser, and a flash lamp. Since the semiconductor laser itself has no high output, a laser diode array module is desirably used.

In this example, an excitation light source 10 which emits the excitation light EXCIT(1) and an excitation light source 40 which emits the excitation light EXCIT(4) are provided. The excitation light EXCIT(1) is incident to the first laser medium component M1 through a condenser lens 11 and a window material 12 for the excitation light. Similarly, the excitation light EXCIT(4) is incident to the fourth laser medium component M4 through a condenser lens 41 and a window material 42 for the excitation light. In this example, since the excitation light from the semiconductor laser has tens of divergence angles in general, a beam size is reduced using a lens in order to emit the laser beam to the side surface of the laser medium with efficiency The laser medium components (M1 to M4) and the prisms (P1 to P4) are contained in an enclosure 200. There are provided with absorbers 201 and 202 which are provided in the inner surface of the enclosure 200 with respect to the spontaneous emission light. A pair of openings is provided at positions facing along the X-axis direction of the enclosure 200, and these openings are closed by a window material W1 and a window material W2 for the seed light. There is provided with an antireflective film W11 for the seed light SEED1 in at least the main surface on a side where the seed light is incident to the first window material W1. In this example, an antireflective film W21 is provided for the seed light SEED1 even in the main surface on a side where the seed light is incident to the second window material W2. Therefore, the seed light can be easily incident to the first window material W1, and easily output from the second window material W2. These main surfaces may be subjected to the antireflection treatment besides the antireflective film.

A gap (about 1 mm) for a coolant C is formed between the adjacent laser medium components (M1 to M4). Gaps (about 1 mm) are formed for the coolant C even between the first window material W1 and the first laser medium component M1 and between the second window material W2 and the fourth laser medium component M4. The laser medium component and the window material come into contact with the coolant C to be cooled down.

Further, as described above, the side surface at the end in the positive direction of the Y axis of the first laser medium component M1, the side surface at the end in the positive direction of the Y axis of the second laser medium component M2, and the hypotenuse part of the prism P1 are subjected to the antireflection treatment with respect to the excitation light and the spontaneous emission light. In addition, the side surface at the end in the negative direction of the Y axis of the second laser medium component M2, the side surface at the end in the negative direction of the Y axis of the third laser medium component M3, and the hypotenuse part of the prism P2 are subjected to the antireflection treatment with respect to the excitation light and the spontaneous emission light. Similarly, the side surface at the end in the positive direction of the Y axis of the third laser medium component M3, the side surface at the end in the positive direction of the Y axis of the fourth laser medium component M4, and the hypotenuse part of the prism P3 are subjected to the antireflection treatment with respect to the excitation light and the spontaneous emission light. Therefore, the excitation lights EXCIT(1) and EXCIT(4) output respectively from the excitation light sources 10 and 40 progress in the respective laser medium components and through the prism, and the entire laser medium component group is excited.

In addition, the laser apparatus of this embodiment is provided with the laser amplification apparatus and a seed light source 100 which emits the seed light SEED1. The seed light SEED1 output from the seed light source 100 is incident to the laser medium components M1 to M4 in the excited state, amplified while passing through these components, and output as the laser beam OUT1.

Further, the seed light SEED1 may reciprocate in the laser medium component group. For example, the incident seed light SEED1 reciprocates in the laser medium component group by reflecting the laser beam OUT1 using a mirror having a reflective film, and then is emitted toward the negative direction of the X axis from the first laser medium component M1.

Figure 11:
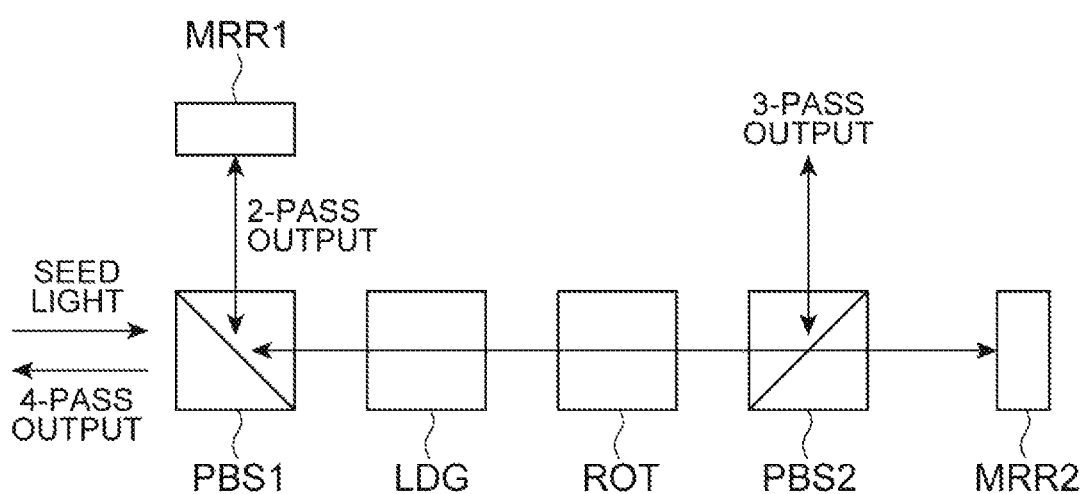
FIG. 11 is a diagram illustrating peripheral apparatuses in the laser amplification apparatus.

Further, if the laser medium components (M1 to M4) of FIG. 2 are used as a laser medium component group LDG, the device illustrated in FIG. 11 can also be configured. In other words, a first polarized beam splitter PBS1 is disposed on the input side of the laser medium component group LDG, a second mirror MRR2 is disposed at a position where the light passes through the second polarized beam splitter PBS2 through a polarization rotation device ROT (polarization switching device) and a second polarized beam splitter PBS2 at the rear end on the output side of the laser medium component group LDG, and a first mirror MRR1 is disposed at a position where the light is reflected by the first polarized beam splitter PBS1.

Further, the first window material W1 illustrated in FIG. 2 can be disposed between the laser medium component group LDG and the first polarized beam splitter PBS1, and the second window material W2 illustrated in FIG. 2 can be disposed between the laser medium component group LUG and the polarization rotation device ROT.

With such a configuration, in a case where the seed light passes through the laser medium component group LDG three times, the configuration is as follows. Further, when the seed light is incident, the spontaneous emission light similarly progressing with the seed light occurs in the laser medium component group LDG, both of which are the laser beam.

The seed light is subjected to P polarization, sent to pass through the first polarized beam splitter PBS1, and then is incident to the laser medium component group LDG (first pass). The laser beam OUT1 passing out the laser medium component group LDG is incident to the polarization rotation device ROT. At this time, a polarization reflective angle of the polarization rotation device ROT is set to 0 degree. In this case, the laser beam OUT1 is incident to the second polarized beam splitter PSB2 while being in the P-polarized state. The laser beam OUT1 passes through the second polarized beam splitter PBS2, reflected by the second mirror MRR2 having a reflective film, is reflected by the second mirror MRR2 provided with a reflective film, and turns back along the advanced path. The reflected laser beam OUT1 passes through the second polarized beam splitter PBS2 in the reverse direction, and is incident again to the polarization rotation device ROT.

At this time, a rotation angle of the polarization rotation device ROT is set to 90 degrees, the laser beam OUT1 is rotated by S polarization, and incident to the laser medium component group LDG in the reverse direction (second pass).

The laser beam passed through the laser medium component group LDG by the S polarization is reflected by the first polarized beam splitter PBS1 due to the S polarization, and the reflected laser beam OUT1 (S polarization) is similarly reflected by the first mirror MRR1 provided with the reflective film and turns back along the advanced path. Then, the laser beam is reflected by the first polarized beam splitter PBS1, passes through the laser medium component group LDG (third pass), and incident to the polarization rotation device ROT. At this time, the rotation angle of the polarization rotation device ROT is set to 0 degree, and the laser beam OUT1 is reflected by the second polarized beam splitter PBS2 while being S-polarized, and output.

Further, in a case where the seed light is configured to pass through the laser medium component group LDG four times, the configuration is as follows. In other words, after the laser beam passes through the laser medium component group LDG for the third time (after 3 passes), the rotation angle of the polarization rotation device ROT is set to 90 degrees, rotates by P polarization, and passes through the second polarized beam splitter PBS2. After the laser beam is reflected by the second mirror MRR2, the rotation angle of the polarization rotation device ROT is set to 0°, and passes through the polarization rotation device ROT while being P-polarized. Therefore, the laser beam passes through the laser medium component group LDG four times (fourth pass), passes through the first polarized beam splitter PBS1, and is output in the reverse direction to the incident direction of the seed light. Further, the polarization rotation device ROT may be configured by an electro-optics modulation device such as Pockelscell. The Pockelscell can modulate the polarization of the light passing therethrough in response to an input voltage pulse time. Besides, a method of inputting the laser beam to an amplifier in plural times may be considered, and this method is the simplest way. The input voltage to the Pockelscell can be made by a control device (not illustrated).

Figure 3:
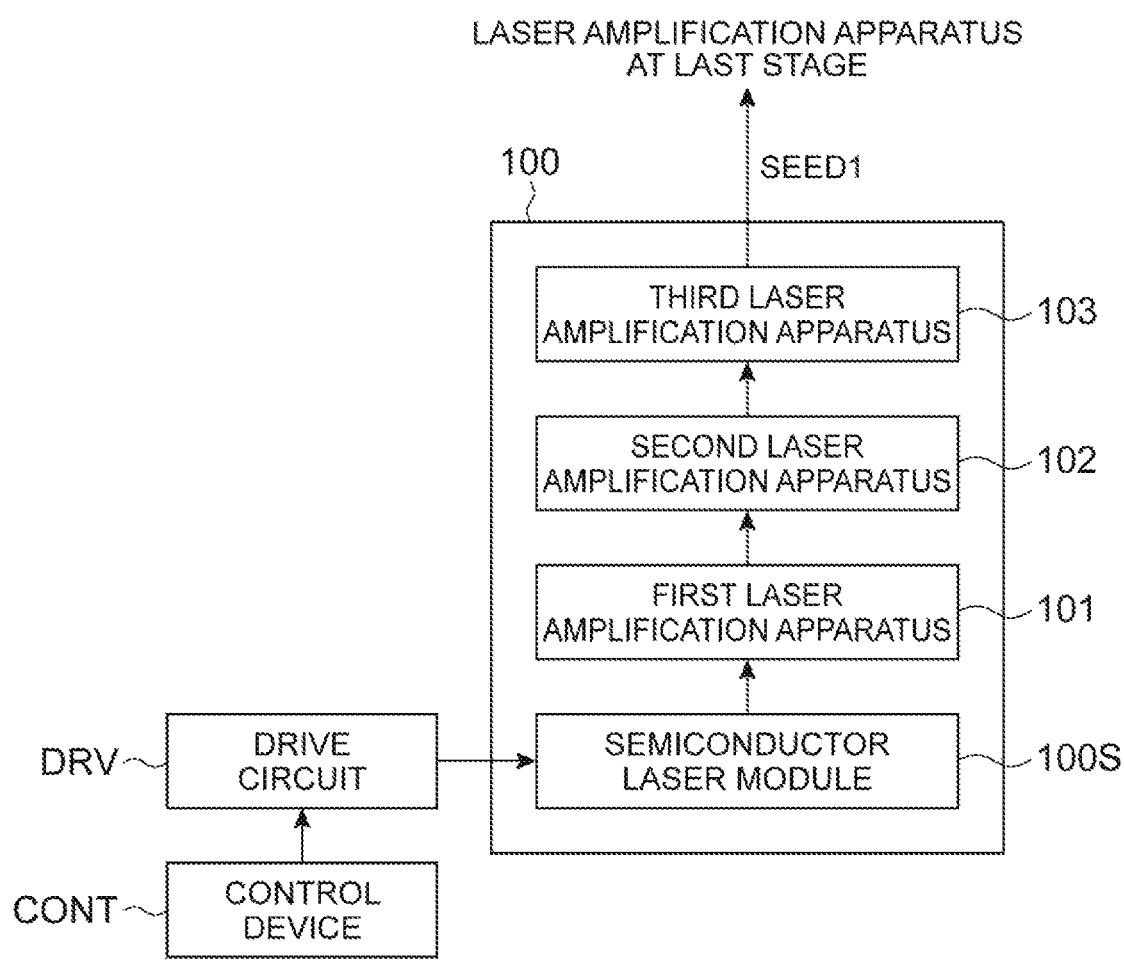
FIG. 3 is a block diagram of a seed light source.

FIG. 3 is a block diagram of the seed light source 100.

The seed light source 100 is provided with a multistage of laser amplification apparatus in order to generate the seed light SEED1. In other words, the seed light source 100 is provided with a laser oscillator 100S (for example, a semiconductor laser, a solid laser, and a fiber laser), a first laser amplification apparatus 101, a second laser amplification apparatus 102, and a third laser amplification apparatus 103. The laser oscillator 100S oscillates by a driving current from a drive circuit DRV, and the drive circuit DRY is controlled by a control device CONT.

When the power of the laser beam output from the laser oscillator 100S is 100 mJ, the first laser amplification apparatus 101 amplifies the power ten times to generate the laser beam having energy of 1 J and inputs the energy to the second laser amplification apparatus 102. The second laser amplification apparatus 102 amplifies the energy ten times to generate the laser beam having energy of 10 J and Inputs the energy to the third laser amplification apparatus 103. The third laser amplification apparatus 103 amplifies the energy five times and outputs the seed light SEED1 having energy of 50 J. The output seed light SEED1 is input to the laser amplification apparatus at the final stage illustrated in FIGS. 1 and 2.

As the first laser amplification apparatus 101, the second laser amplification apparatus 102, and the third laser amplification apparatus 103, an Yb:YAG laser amplifier may be employed, and an optical fiber amplifier may also be used.

Figure 4:
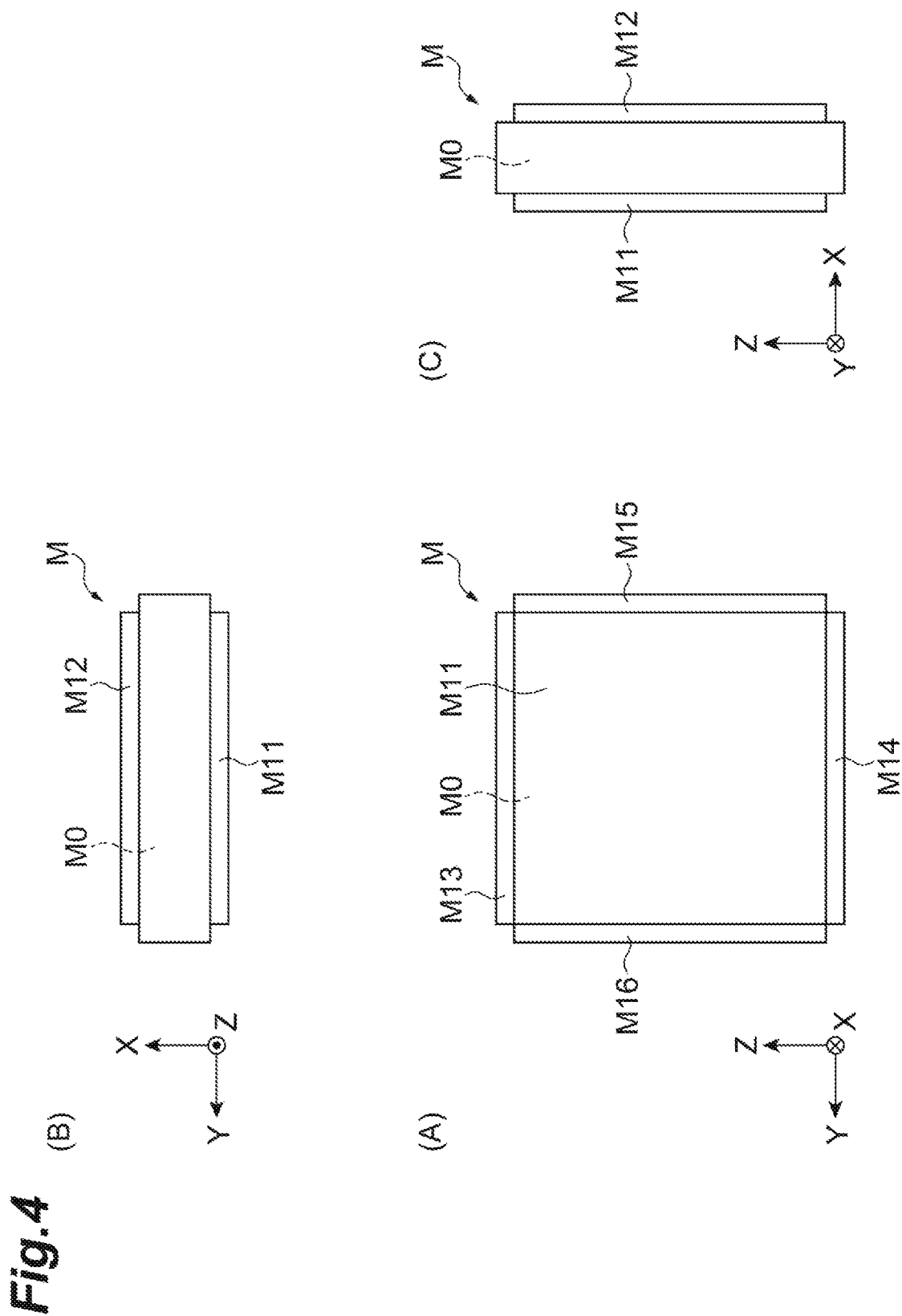
FIG. 4 is a diagram illustrating a configuration (first example) of the laser medium component.

FIG. 4 is a diagram illustrating a structure (first example) of the laser medium component M. The drawing representatively illustrates any one of the laser medium components (M1 to M4) described above.

In the main surface to which the seed light SEED1 of the laser medium component M is incident, the antireflection treatment is performed with respect to the seed light. In this example, an antireflective film M11 is provided. In addition, even in the main surface from which the seed light SEED1 of the laser medium component M is emitted, the antireflection treatment is performed with respect to the seed light. In this example, an antireflective film M12 is provided.

Further, in the upper surface (the XY surface on a side in the positive direction of the Z axis) and the lower surface (the XY surface on a side in the negative direction of the Z axis) of the laser medium component M, clad materials (M13 and M14) are glued or bonded to absorb the spontaneous emission light.

In addition, in the right side surface (the XZ surface on a side in the negative direction of the Y axis) and the left side surface (the XZ surface on a side in the positive direction of the Y axis) of the laser medium component M, the antireflection treatment is performed with respect to the excitation light and the spontaneous emission light. In this example, antireflective films M15 and M16 are individually provided.

Further, it is assumed that a wavelength $\lambda 1$ of the seed light and the spontaneous emission light is 1,030 nm, and a wavelength $\lambda 2$ of the excitation light is 940 nm ($\lambda 1 < \lambda 2$). A body portion (the single laser medium in this example) M0 of the laser medium component M is an Yb (ytterbium)-additive YAG. It is assumed that the size is 50 mm×50 mm×10 mm (thickness), and the additive concentration of Yb is 0.15 wt % in the first laser medium component M1 and the fourth laser medium component M4, and 0.25 wt % in the second laser medium component M2 and the third laser medium component M3.

As a clad material for absorbing the spontaneous emission light (1,030 nm), there are a samarium-additive material, chrome-additive material, and a copper-additive material. Specifically, there are a samarium-additive YAG, a samarium-additive glass, a chrome-additive YAG, a chrome-additive glass, a copper-additive YAG, and a copper-additive glass. These clad materials are glued or bonded to fix the body portion M0 of the laser medium. In the case of gluing, the adhesive b is interposed therebetween. In a case where the adhesive b is used, an adhesive such as a resin refractive index matching adhesive and a glass index matching adhesive may be used. In a case where the adhesive is not used, bonding such as thermal diffusion bonding, optical contact, and ion sputtering bonding may be used. In a case where the outer surface of the laser medium component and the clad material are made of ceramics, these components can be fixed using a ceramic sintering bonding.

The material of the antireflective film with respect to the excitation light (940 nm) and the gluing and bonding method are the same as those of the seed light or the spontaneous emission light.

In the case of the structure, it is possible to suppress unnecessary resonance caused by the seed light or the spontaneous emission light using the antireflective film. Since the antireflective films M11 and M12 are provided in the main surface of the laser medium component M, the reflection of the seed light SEED1 caused by the laser medium component M is suppressed, and the unnecessary resonance is suppressed.

Further, since the side surface of the laser medium component M and the prism are glued or bonded as illustrated in FIG. 1, the excitation light is surely guided from the side surface of the laser medium component into the prism. Even in the boundary between the laser medium component and the prism, the reflection is suppressed by employing the same refractive index matching material as that of the adhesive of this example as the adhesive b of FIG. 1, and the energy loss is suppressed. Since the seed light and the spontaneous emission light leaked from the laser medium component or the prism to the outside thereof cause the resonance, the absorbers 201 and 202 are provided in the inner surface of the enclosure 200 illustrated in FIG. 2, and these lights are absorbed by the absorbers 201 and 202 to suppress the unnecessary resonance still more. Further, the material of the prism includes glass, YAG ceramics, YAG crystal, the same material as the clad material, or synthetic silica. As an adhesive which can make the refractive index matching, the same material as the adhesive b may be used.

Figure 5:
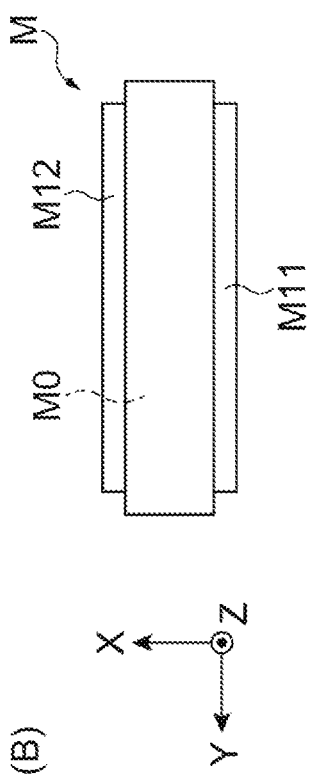
FIG. 5 is a diagram illustrating a configuration (second example) of the laser medium component.
Figure 5:
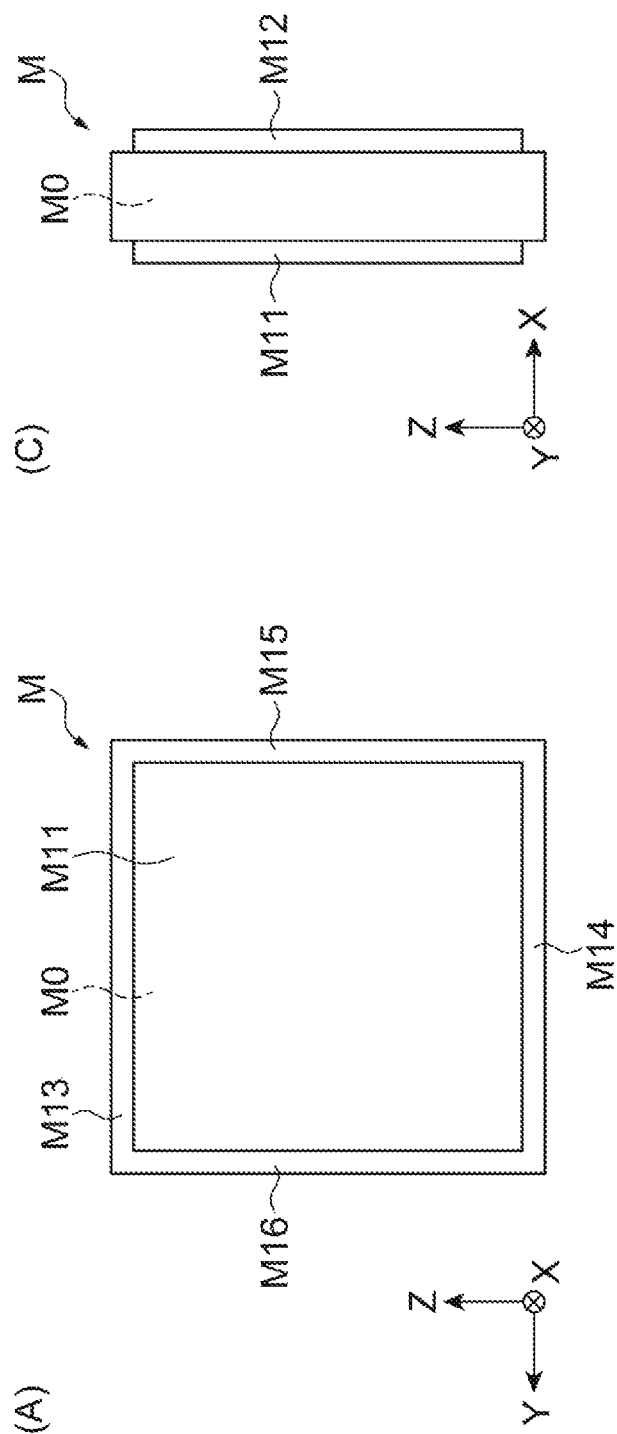

FIG. 5 is a diagram illustrating a configuration (second example) of the laser medium component.

In the second example, the clad material is integrated over four surfaces (M13, M14, M15, and M16), and the other configurations are the same as those of the first example. The clad material surrounds to cover the periphery of the body portion M0, and more strongly fixed to the body portion M0. At the positions of M15 and M16, the antireflection treatment is performed onto the clad material with respect to the excitation light and the spontaneous emission light.

Figure 6:
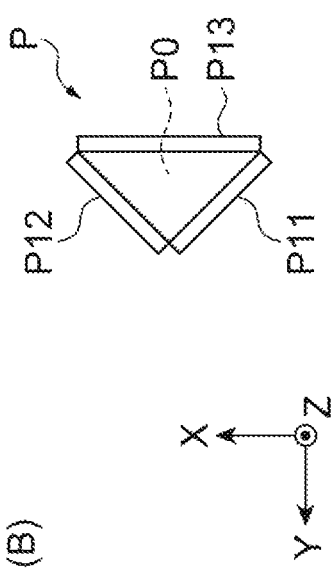
FIG. 6 is a diagram illustrating a structure of the prism.
Figure 6:
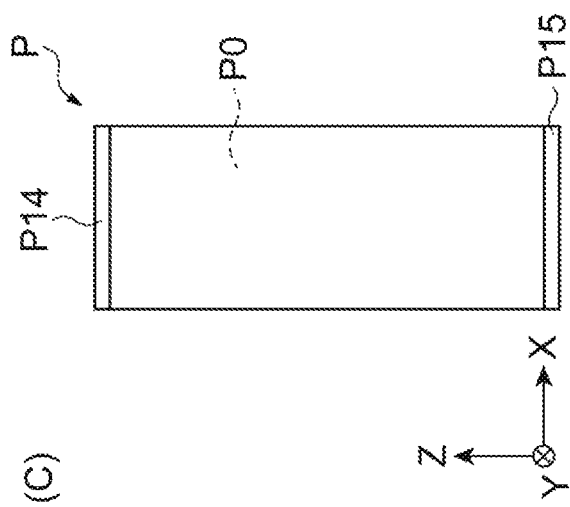
Figure 6:
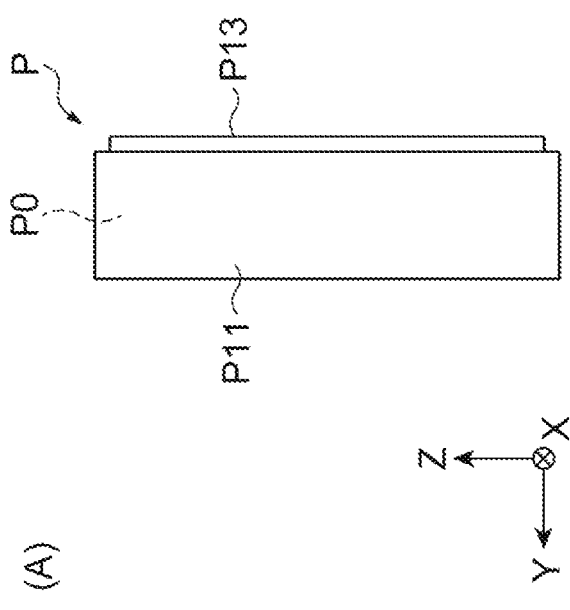

FIG. 6 is a diagram illustrating a structure of the prism P. The drawing representatively illustrates any one of the prisms (P1 to P3) described above.

The pole-like prism P has five surfaces, and all the surfaces are subjected to coating after being optical polishing. In the upper and lower surfaces (XY surfaces), reflective films P14 and P15 with respect to the excitation light (940 nm) are formed, and the other surfaces (the first reflection surface, the second reflection surface, and the excitation-light input/output surface) are subjected to a specific coating. A coating P11 of the first reflection surface and a coating P12 of the second reflection surface both serve as the antireflective film with respect to the seed light (1,030 nm), and serve as the reflective film with respect to the excitation light (940 nm). The excitation-light input/output surface is subjected to the antireflection treatment with respect to the excitation light and the spontaneous emission light. The material of a body portion P0 of the prism includes glass, YAG ceramics, YAG crystal, a clad material, or synthetic silica.

Figure 7:
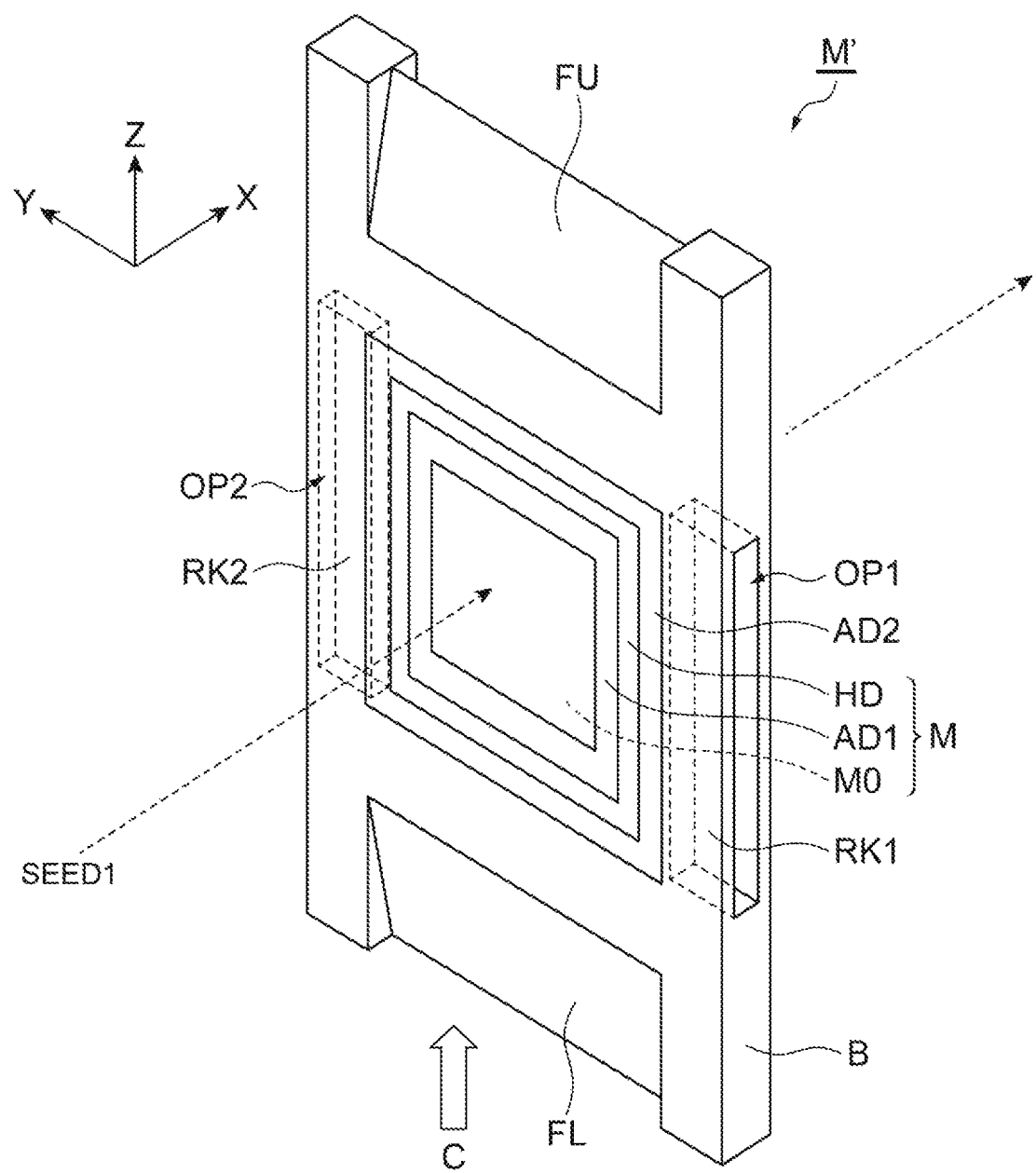
FIG. 7 is a perspective view of the laser medium component and a window material.

FIG. 7 is a perspective view illustrating a layout of the laser medium component and the window material.

A laser medium component M' of this example is configured such that the laser medium component M (M1 to M4) is immersed in an opening in an opening frame component B, and glued to the inner surface of the opening through an adhesive AD2. The opening frame component B has a structure in which fins FU and FL are positioned on the upper and lower surfaces (XY surface) of the laser medium component M. The clad material illustrated in FIG. 4 or 5 is provided surround the body portion M0 of the laser medium, and the clad material is denoted by symbol HD. The clad material HD and the body portion M0 are glued through an adhesive AD1.

The opening frame component B is opened in a direction vertical to the incident direction of the seed light, and the laser medium component M is immersed in the opening. The adhesive AD2 is interposed between the periphery of the laser medium component M and the inner surface of the opening. Further, the side surface (XZ surface) of the opening frame component B includes an opening OP1 and an opening OP2, and the laser medium component M is exposed in the openings OP1 and OP2. Therefore, the excitation light can be introduced into the laser medium component M through the openings OP1 and OP2 so as to be output. The prism is disposed on the outer side of the openings OP1 and OP2 as illustrated in FIG. 1 or 2.

The opening frame component B is interposed at a position where the upper and lower fins FU and FL are connected, and includes connection portion RK1 and RK2 which are positioned on the side portion of the center opening. The openings OP1 and OP2 are formed in the connection portions RK1 and RK2, respectively.

Further, the window material can also be fixed in the opening frame component B similarly to the laser medium component M.

The opening frame component B is a frame of which the center is opened. The opening frame component B described above can be manufactured using various methods such as lathe processing. The opening frame component B is formed in an H shape as illustrated in FIG. 7, and the wedge-shaped fins FU and FL are formed in the upper portion and the lower portion. The wedge-shaped fins FU and FL have a shape of a triangular prism, a trapezoidal column, or a semi-elliptic column such that a width in X-axis direction of the fins become narrow as the fins go to be separated from the gravity center of the laser medium component M along the Z-axis direction. Further, the fins FU and FL provided in the window materials (W1 and W2) may have a shape of the trapezoidal column. In other words, the XZ cross-sectional shape of each of the fins FU and FL is a triangular shape, a trapezoidal shape, or a semi-elliptic shape.

The connection portions RK1 and RK2 may have a structure of serving as a spacer with respect to the adjacent laser medium component. The connection portions PK1 and RK2 extend in the Z-axis direction, and have a function of rectifying a liquid coolant. In addition, the window material and the laser medium component is a member for the fixation to the enclosure 200 as an external housing, the window materials (12 and 42) forming the wall surface thereof, or the absorbers (201 and 202) (see FIG. 2). While the coolant C flows from bottom to top along the Z axis, the shapes of the fins FU and FL become to be tapered. Therefore, the liquid is rectified, and the coolant C can efficiently flow with a small pressure. The coolant is softly introduced into a gap in order not to increase a voltage loss of the coolant.

Figure 8:
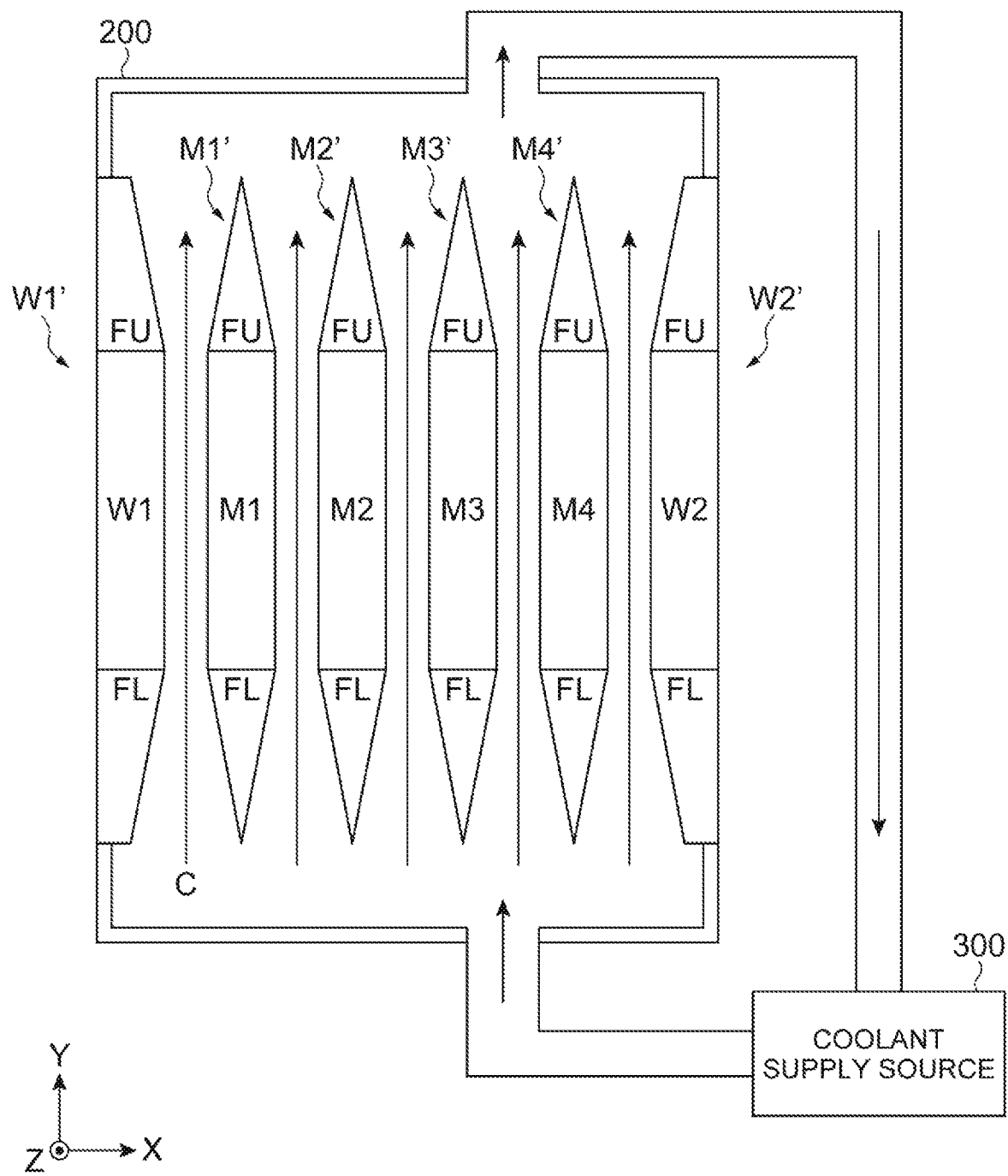
FIG. 8 is a diagram illustrating a cooling system in the laser amplification apparatus.

FIG. 8 is a diagram illustrating a cooling system in the laser amplification apparatus.

The laser amplification apparatus is provided with a coolant supply source 300 which supplies the coolant C to a gap between the laser medium component M (M1' to M4') represented by the above laser medium component M'. The laser medium components (M1' to M4') are irradiated with the excitation light and the seed light and heated up. Therefore, in a case where these components are arranged, and the coolant C is supplied, the temperature of the laser medium component can be kept at a desired temperature (for example, a room temperature (27° C.), and can amplify the laser light safely. As the coolant C, for example, water, nitrogen gas, helium gas, other rare gas, fluorine-based inactive gas, or heavy water may be used. A pipe extending from the coolant supply source 300 extends up to the inner portion of the enclosure 200, and the coolant C passed through the enclosure 200 is circulated to turn back to the coolant supply source 300 through a pipe.

Further, in this example, both ends in the Y-axis direction of the fins FU and FL of window materials (W1' and W2') are fixed to the enclosure 200.

Figure 9:
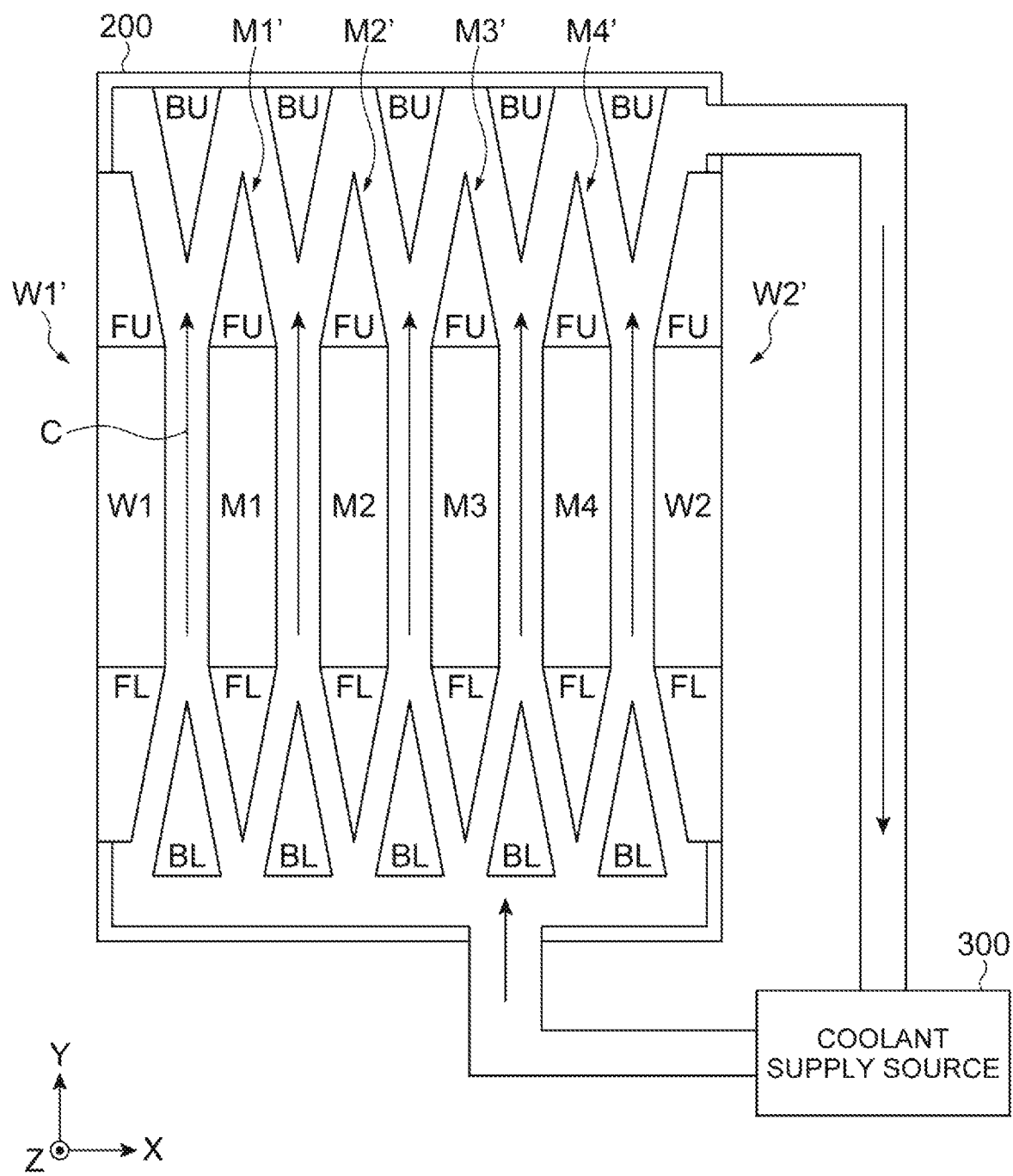
FIG. 9 is a diagram illustrating the cooling system in the laser amplification apparatus.

FIG. 9 is a diagram illustrating another cooling system in the laser amplification apparatus. Wedge-shaped rectification members BU and BL may be disposed at positions facing the wedge-shape fins FU and FL on a path of the coolant C. With this configuration, the coolant C flows evenly.

Figure 10:
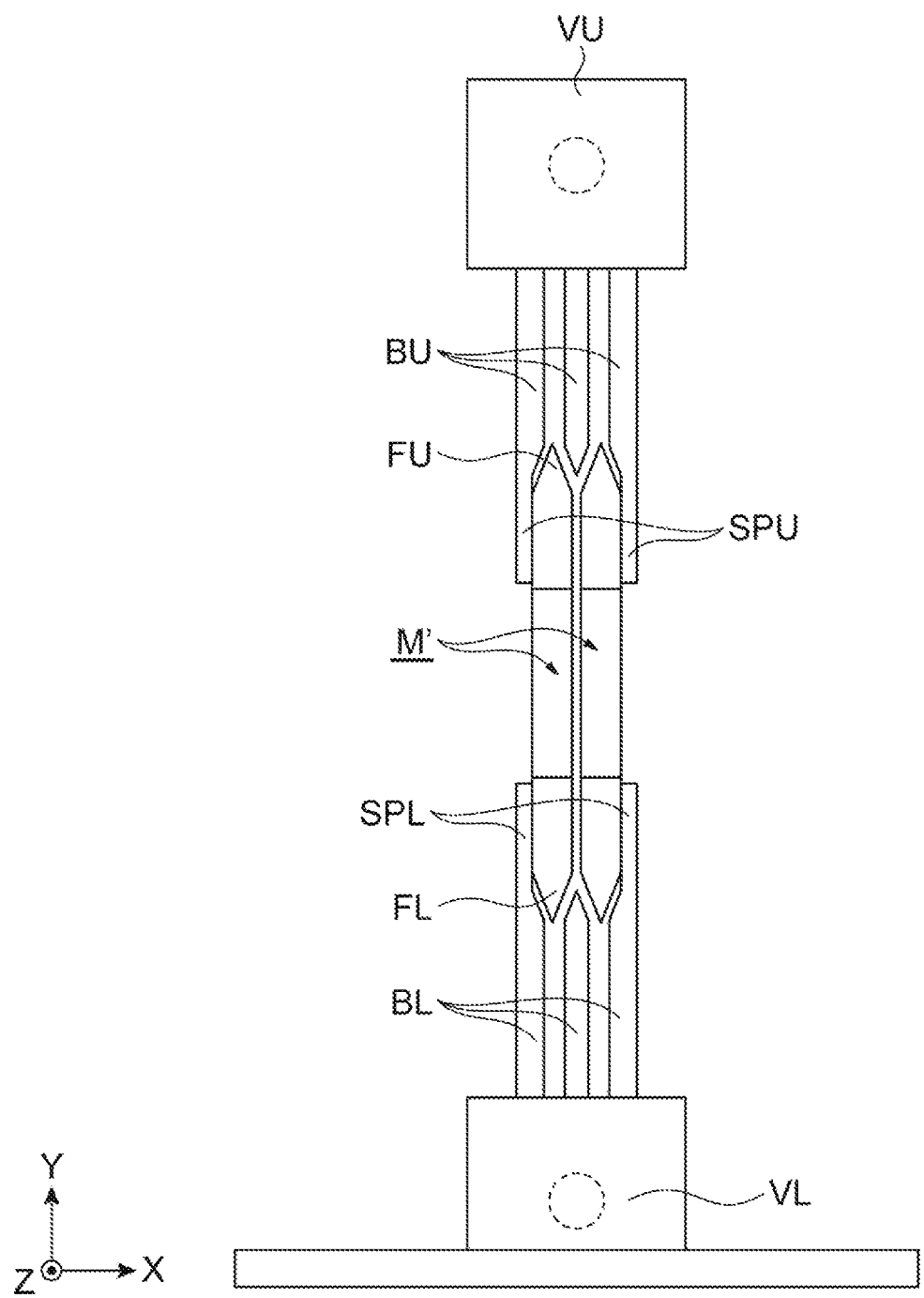
FIG. 10 is a diagram illustrating the cooling system in the laser amplification apparatus.

FIG. 10 illustrates an exemplary structure of the laser medium component group LDG in which the structure of the rectification member is employed. In this drawing, two laser medium components M' are disposed to be adjacent along the X-axis direction, and the fins FU and FL face the rectification members BU and BL. The rectification members BU and BL positioned at both ends in the X-axis direction are connected to support portions SPU and SPL which fix the YZ surface of the opening frame component B.

The rectification member and the support portion form a support component as a whole, and are fixed to accumulation vessels VU and VL of the coolant. The coolant is temporarily accumulated in the accumulation vessels VU and VL. The coolant supply source (pump) is connected to the accumulation vessels VL and VL.

Figure 12:
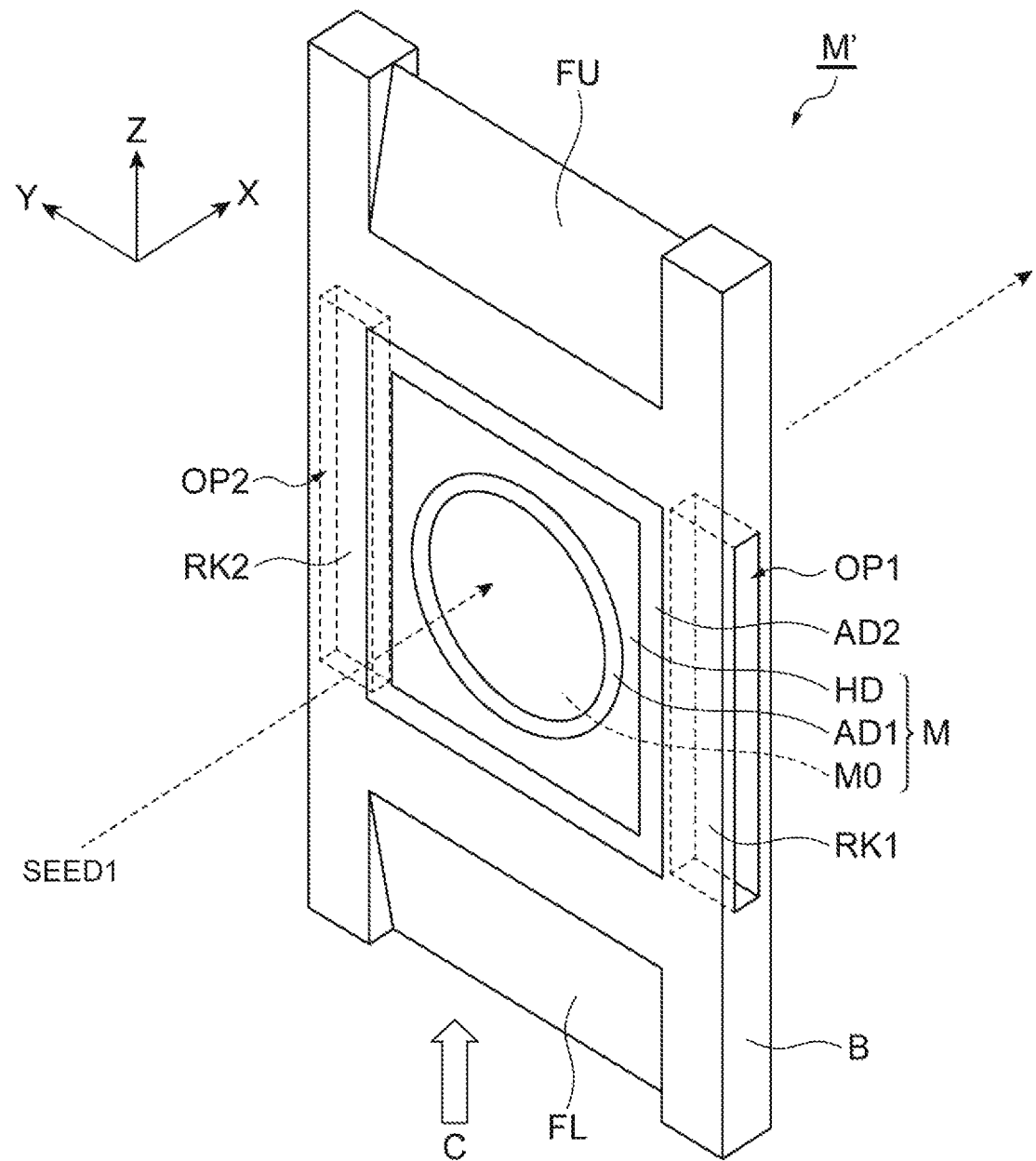
FIG. 12 is a perspective view of the laser medium component.

FIG. 12 is a perspective view of the laser medium component M' of the laser amplification apparatus. The laser medium component M' may be replaced with the laser medium components (M1' to M4') described above.

The laser medium component M' is different from that illustrated in FIG. 7 in the shape of the body portion M0 of the laser medium. While being a rectangular shape in FIG. 7, the shape of the YZ plane is formed in a circular shape in this example. In addition, the clad material HD is formed such that the outer periphery is a rectangular shape and the inner periphery is a circular shape. The laser medium component M may be formed only by the body portion M0 (that is, only by the laser medium). However, in this example, the clad material is provided in the periphery. The body portion M0 of the laser medium component is formed in a disk shape. The laser medium component M is formed only by the laser medium, or is provided with a laser medium and a clad material HD as a frame for supporting the laser medium by surrounding the side surface thereof. The clad material HD serves as a holder which supports the body portion M0. The holder is configured of metal, and the clad material may be formed on the inner side surface thereof. The holder includes a circular opening along the X-axis direction, and the outer periphery of the body portion M0 of the laser medium component is fixed in the opening.

The seed light is emitted to the main surface of the laser medium. However, in a case where the laser light is focused and applied, it is desirable that a beam shape be a circular shape. In a case where there is an angular portion such as a rectangular, the energy becomes a light condensing pattern in which the energy is dispersed in space where a spatial high frequency component is reflected. When the laser medium is formed in a disk shape, the shape of the beam propagating in the disk-shaped laser medium is set to a circular shape, and a good light condensing pattern can be obtained.

Figure 13:
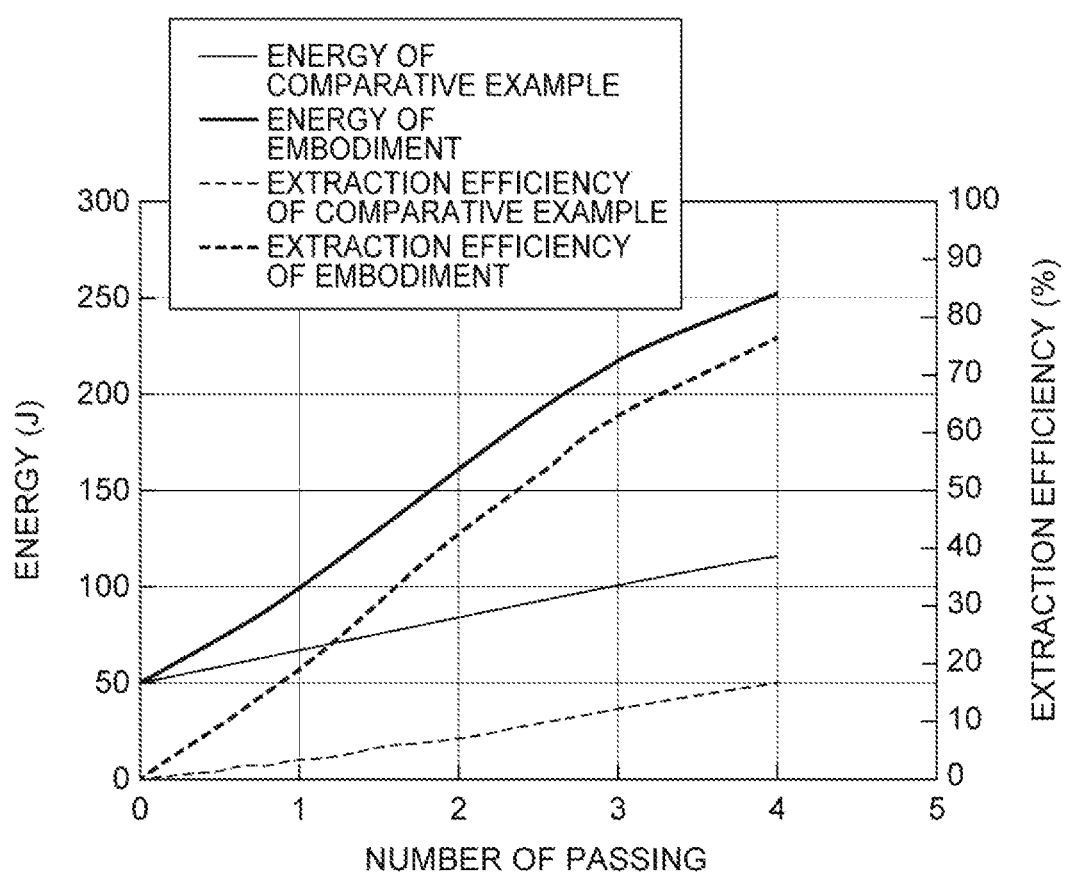
FIG. 13 is a graph illustrating a relation between the number of times that a seed light passes through a group of laser medium components (the number of passing), energy (J) of the output laser light, and extraction efficiency (%).

FIG. 13 is a graph illustrating a relation between the number of times (the number of passing) that the seed light passes through a group of laser medium components, energy (J) of the output laser light, and extraction efficiency (%).

In the embodiment where the structure of FIG. 1 is employed, the material of the laser medium is a Yb-additive YAG, and the concentration of Yb is 0.2 wt %. On the other hand, the concentration of Yb in a comparative example has been set to 1.0 wt %. The calculation is performed assuming that the energy of the input seed light is set to 50 J. The dimension of the laser medium is 50 mm×50 mm×10 mm, and in either case, the energy excited in the laser medium is set to 525 J, and the accumulated energy is set to 264 J. In addition, an absorption rate of the excitation light is set to 90% (or more) in any case.

In this case, the number of passing in the embodiment is "4", the obtained output is 250 J, and an extraction efficiency of 75% is obtained. On the other hand, in a case where the number of passing in the comparative example is "4", the output of 120 J is obtained, and the extraction efficiency of 18% is obtained.

Further, the extraction efficiency indicates a level of extractable energy accumulated in the laser medium.

In a case where Yb:YAG is used as the laser medium, the laser light is generated by 3-level transition. The concentration of Yb is larger than 0 wt %, and desirably set to 0.3 wt % or less, and more desirably 0.2 wt % or less. Therefore, it is possible to significantly improve the output of the laser light. When the concentration of Yb is set as low as possible, the reabsorption of the seed light is hardly generated in the case of the 3-level laser medium. Therefore, the above-described effect becomes higher more than the case of the comparative example even when the concentration of Yb is equal to or less than 0.3 wt % on the basis of a physical phenomenon.

A doping concentration of the laser medium component may be different. For example, in a case where the excitation current EXCIT(1) is incident from the first laser medium component M1, the amount of energy accumulated in the first laser medium component and the second laser medium component M2 can be set to be equal by decreasing the doping concentration of the first laser medium component M1 and by increasing the doping concentration of the second laser medium component M2.

Similarly, since the doping concentration of the third laser medium component M3 is higher than that of the second laser medium component M2, and the doping concentration of the fourth laser medium component M4 is higher than that of the third laser medium component M3, the accumulated energy of the laser medium component group can be evenly distributed.

Therefore, it is possible to suppress an unexpected amplification/oscillation and a resonance which easily occur in a place where the accumulated energy is high. As a result, much more energy can be accumulated in the laser medium component group.

In addition, in a case where the first laser medium component M1 and the fourth laser medium component M4 are excited by the excitation lights EXCIT(1) and EXCIT(4), respectively, the doping concentrations of the first laser medium component M1 and the fourth laser medium component M4 become low, and the doping concentrations of the second laser medium component M2 and the third laser medium component M3 become high. In addition, when the number of laser medium components is increased, the number of types of the doping concentration is also increased in accordance with the increase.

Further, the Yb:YAG laser is a 3-level laser in which a Yb-additive YAG crystal is used as the laser medium. The Yb:YAG crystal has a strong absorption line of a width of 18 nm at a wavelength of 941 nm, and a width of 4 nm at a wavelength of 968 nm. With a wide absorption band, a high-efficiency excitation can be achieved by an InGaAs semiconductor laser. An oscillation wavelength is 1030 nm. A fluorescence lifetime is longer than 5 times compared to that of an Nd:YAG crystal. With this laser medium, it is possible to easily manufacture a crystal which has a large accumulation power per unit excitation power, a high thermal conductivity, and a high quality.

Figure 14:
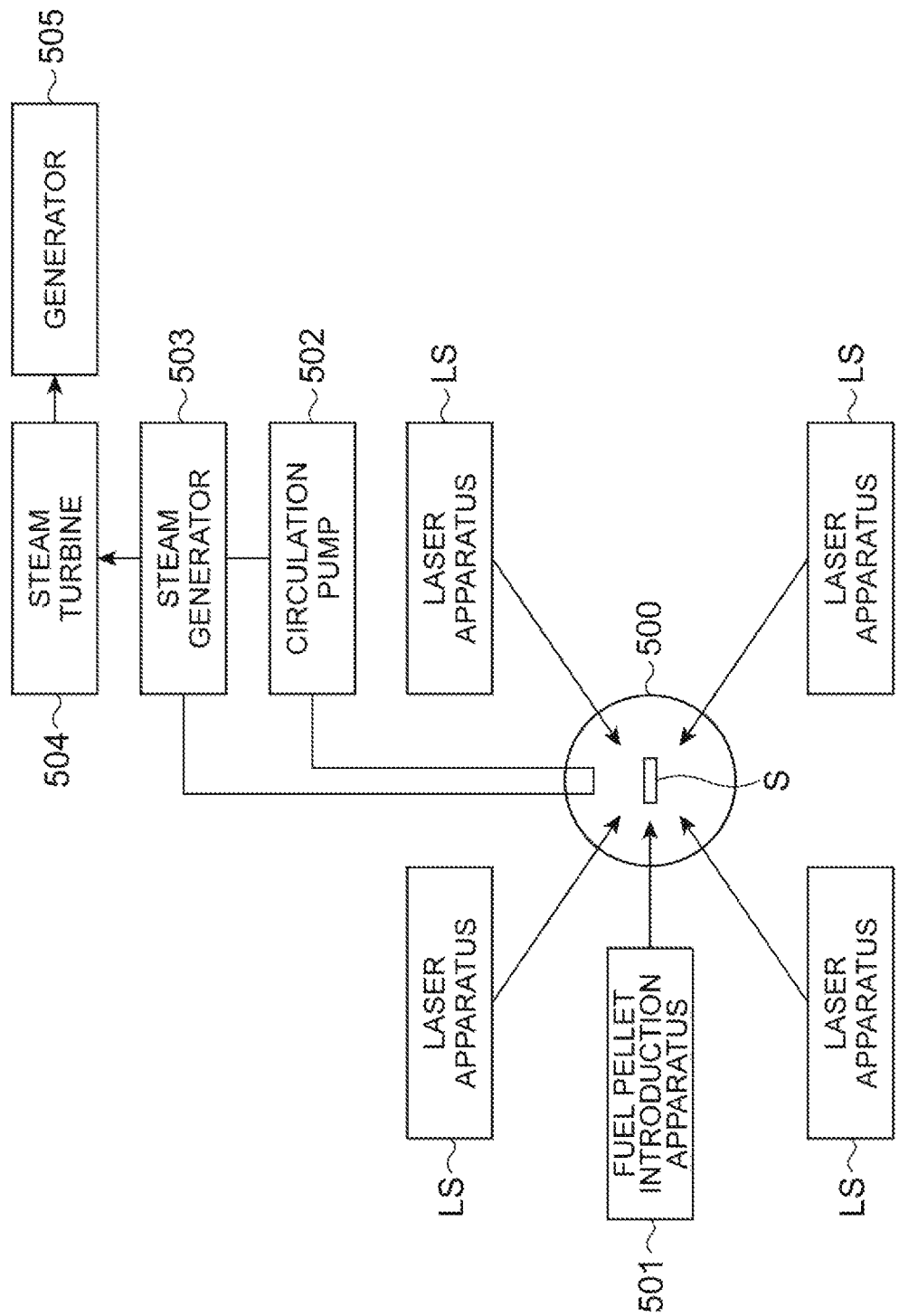
FIG. 14 is a diagram illustrating a system of a laser nuclear fusion reactor.

FIG. 14 is a diagram illustrating a system of the laser nuclear fusion reactor.

The laser nuclear fusion reactor is provided with a plurality of the laser apparatuses LS, and a chamber 500 which stores a fuel S to generate nuclear fusion when being irradiated with the laser light and through which the laser light is introduced from the laser apparatus LS. Since the laser light is emitted from a high-power laser apparatus LS in the laser nuclear fusion reactor, the laser medium can be efficiently subjected to the nuclear fusion in the chamber, and the generated energy can be used for power generation.

A pellet of the fuel S is introduced into the chamber 500 by a fuel pellet introduction apparatus 501. Heat generated in the chamber 500 is transferred to the medium in a pipe communicating with the chamber 500, and sent to a steam generator 503. The medium in the pipe is circulated by a circulation pump 502. A steam turbine 504 is rotated by steam generated by the steam generator 503, and a driving force is transferred to a generator 505 to generate power.

Hitherto, the description has been given about the laser amplification apparatus, the laser mediums may have a different Yb: addition concentration at a first time and a second tune. Various shapes of the laser medium may also be employed. In addition, the laser medium may be a material obtained by bonding the Yb-additive YAG and an additive-free YAG. Besides Yb, a material for the 3-level laser may be used as an additive material. The laser medium may be irradiated with the excitation light from two or more directions. The number of laser medium components may be increased or decreased. The shape of the prism may be a parabolic shape or an elliptical shape instead of the triangular prism. A heat ray absorption glass, water, a samarium optical element may be used as an absorber for absorbing the excitation light passed through the prism.

REFERENCE SIGNS LIST

M1 to M4 laser medium component
P1 to P3 prism

The invention claimed is:

1. A laser amplification apparatus, comprising:
a plurality of plate-shaped laser medium components each having a main surface, a first side surface, and a second side surface, the first and second side surfaces extending along a thickness of the laser medium components;
one or more prisms optically coupled to the first side surfaces or the second side surfaces of the laser medium components;
one or more excitation light sources configured to apply excitation light to at least one of the first side surfaces and second side surfaces of the laser medium components; and
a seed light source configured to apply seed light to the main surface of one of the laser medium components,
wherein the plurality of laser medium components are aligned along a direction of the seed light with the main surfaces of the laser medium components facing the seed light,
the main surface of the laser medium component to which the seed light is applied is subjected to an antireflection treatment with respect to the seed light, and
the first side surfaces or the second side surfaces of the laser medium components and the one or more prisms are respectively glued or bonded,
the laser amplification apparatus further comprising:
an enclosure configured to store the laser medium components and the one or more prisms; and
an absorber provided on an inner surface of the enclosure and configured to absorb a spontaneous emission light from the laser medium components.

2. The laser amplification apparatus according to claim 1, further comprising:
a coolant supply source configured to supply a coolant to a gap between the laser medium components.

3. The laser amplification apparatus according to claim 1, wherein the first side surface or the second side surface of one of the laser medium components to which the excitation light is first incident is subjected to an antireflection treatment with respect to the excitation light.

4. The laser amplification apparatus according to claim 1, wherein the one or more prisms is a plurality of prisms configured to direct the excitation light in through each of the side surfaces of the plurality of laser medium components in series, and
a reflective film is provided at a last side surface of the series.

5. The laser amplification apparatus according to claim 1, wherein each of the laser medium components consists of a plate of a laser medium.

6. The laser amplification apparatus according to claim 5, wherein the plate of the laser medium is a disk shape.

7. The laser amplification apparatus according to claim 5, wherein a material of the laser medium is a Yb-additive YAG.

8. A laser nuclear fusion reactor, comprising:
a chamber configured to store nuclear fusion fuel; and
the laser amplification apparatus according to claim 1,
wherein the laser amplification apparatus is configured to introduce laser light into the chamber.

9. The laser amplification apparatus according to claim 1, wherein each of the laser medium components comprises a plate of a laser medium and a holder configured to support the plate of the laser medium.

10. The laser amplification apparatus according to claim 9, wherein the plate of the laser medium is a disk shape.

11. The laser amplification apparatus according to claim 9, wherein a material of the laser medium is a Yb-additive YAG.

12. A laser amplification apparatus, comprising:
a plurality of laser medium components, each laser medium component having
a flat plate shape with a main surface extending in an YZ plane defined by Y and Z axes of a Cartesian coordinate system, and
first and second side end surfaces extending in an XZ plane defined by X and Z axes of the Cartesian coordinate system, the first and second side end surfaces adjoining the main surface, the first side end surface being opposite to the second side end surface, wherein the plurality of laser medium components are aligned along the X axis direction;

the laser amplification apparatus further comprising:

one or more prisms, wherein,
- for odd values of n, an n-th prism is optically coupled to the first side end surface of an n-th laser medium component of the plurality of laser medium components, and to the first side end surface of an (n+1)-th laser medium component of the plurality of laser medium components,
- for even values of n, an nth prism is optically coupled to the second side end surface of the n-th laser medium component of the plurality of laser medium components, and to the second side end surface of the (n+1)-th laser medium component of the plurality of laser medium components, and
- n equals at least 1;

one or more excitation light sources configured to apply excitation light to at least one of the first side end surfaces and second side end surfaces of the laser medium components; and a seed light source configured to apply seed light to the main surface of one of the laser medium components, wherein each of the first and last of the plurality of laser medium components aligned along the X axis direction is optically coupled to only one of the one or more prisms.

13. The laser amplification apparatus according to claim 12, further comprising:
a coolant supply source configured to supply a coolant to a gap between adjacent laser medium components of the plurality of laser medium components.

14. The laser amplification apparatus according to claim 12,
wherein the first or second side end surface of one of the laser medium components to which the excitation light from the excitation light source is first incident is subjected to an antireflection treatment with respect to the excitation light.

15. The laser amplification apparatus according to claim 12,
wherein the one or more prisms is a plurality of prisms configured to direct the excitation light in through each of the side end surfaces of the plurality of laser medium components in series, and
a reflective film is provided in a last side end surface of the series.

16. The laser amplification apparatus according to claim 12,
wherein the main surface of the laser medium component to which the seed light is applied is subjected to an antireflection treatment with respect to the seed light,
wherein the first or second side end surfaces of the laser medium components and the one or more prisms are glued or bonded to each other,
the laser amplification apparatus further comprising:
an enclosure configured to store the laser medium components and the one or more prisms; and
an absorber provided on an inner surface of the enclosure and configured to absorb a spontaneous emission light from the laser medium components.

17. The laser amplification apparatus according to claim 12,
wherein each laser medium component consists of a plate of a laser medium.

18. The laser amplification apparatus according to claim 17,
wherein the plate of the laser medium is a disk shape.

19. The laser amplification apparatus according to claim 17,
wherein a material of the laser medium is a Yb-additive YAG.

20. A laser nuclear fusion reactor, comprising:
the laser amplification apparatus according to claim 19; and
a chamber configured to store fuel, wherein the fuel is suitable for generating nuclear fusion when the chamber is irradiated with a laser light from the laser amplification apparatus.

21. The laser amplification apparatus according to claim 12,
wherein each laser medium component comprises a plate of a laser medium and a holder configured to support the plate of the laser medium.

22. The laser amplification apparatus according to claim 21,
wherein the plate of the laser medium is a disk shape.

23. The laser amplification apparatus according to claim 21,
wherein a material of the laser medium is a Yb-additive YAG.

24. A laser nuclear fusion reactor, comprising:
the laser amplification apparatus according to claim 23; and
a chamber configured to store fuel, wherein the fuel is suitable for generating nuclear fusion when the chamber is irradiated with a laser light from the laser amplification apparatus.

* * * * *